United States Patent [19]

Uchiyama

[11] Patent Number: 4,845,570
[45] Date of Patent: Jul. 4, 1989

[54] OPTICAL IMAGE SENSOR

[75] Inventor: Masahiro Uchiyama, Mishima, Japan

[73] Assignee: Tokyo Electric Co., Ltd., Tokyo, Japan

[21] Appl. No.: 101,289

[22] Filed: Sep. 25, 1987

[30] Foreign Application Priority Data

Sep. 29, 1986 [JP] Japan ................... 61-230718
Sep. 29, 1986 [JP] Japan ................... 61-230719
Sep. 29, 1986 [JP] Japan ................... 61-230720
Sep. 29, 1986 [JP] Japan ................ 61-149146[U]

[51] Int. Cl.⁴ ............................................. H04N 1/10
[52] U.S. Cl. ..................... 358/496; 358/475
[58] Field of Search ............... 358/293, 294, 285, 256, 358/286, 288; 355/50, 51

[56] References Cited

U.S. PATENT DOCUMENTS 4,442,459  4/1984  Fukui et al. ................. 358/286
4,652,937  3/1987  Shimura et al. .
4,682,042  7/1987  Igarashi .

FOREIGN PATENT DOCUMENTS 3412501  10/1985  Fed. Rep. of Germany .
3538217   5/1986  Fed. Rep. of Germany .
0130267  10/1980  Japan ....................... 358/256
0014246   1/1982  Japan ....................... 358/285
0250772  12/1985  Japan ....................... 358/256
2178263   2/1987  United Kingdom .

OTHER PUBLICATIONS

English Language Abstract of German DE-A-3412501.

Primary Examiner—James J. Groody
Assistant Examiner—David E. Harvey
Attorney, Agent, or Firm—Frishauf, Holtz, Goodman & Woodward

[57] ABSTRACT

An optical image sensor has a body case on which an elongate image sensing window is formed, a linear lamp disposed in the case so as to be parallel to the window, and an optically image snesing unit disposed in the case. The unit optically senses the image on a document moving on the case across the window by utilizing the reflection of light emitted from the lamp when the image passes over the window. The linear lamp is so disposed in the case that the center in the longitudinal direction thereof is not brought into coincidence with the center of the window, and a portion of the case, corresponding to the one end of the lamp which is further away from the center of the window, is constructed as a pair of article holding recesses.

10 Claims, 12 Drawing Sheets

F I G. 13
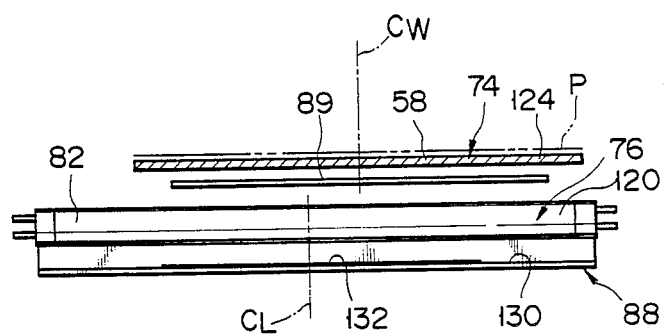
F I G. 14
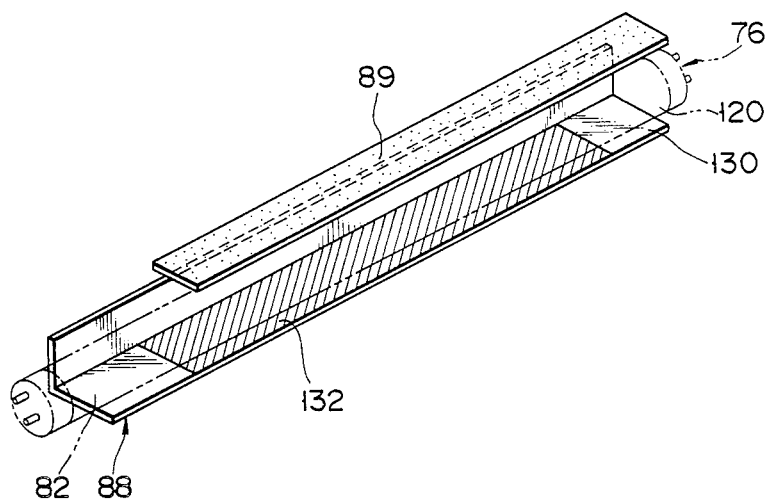

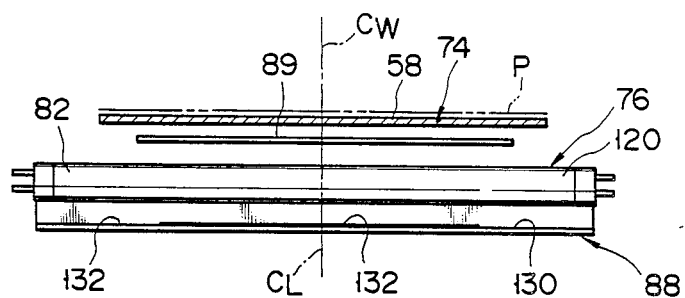
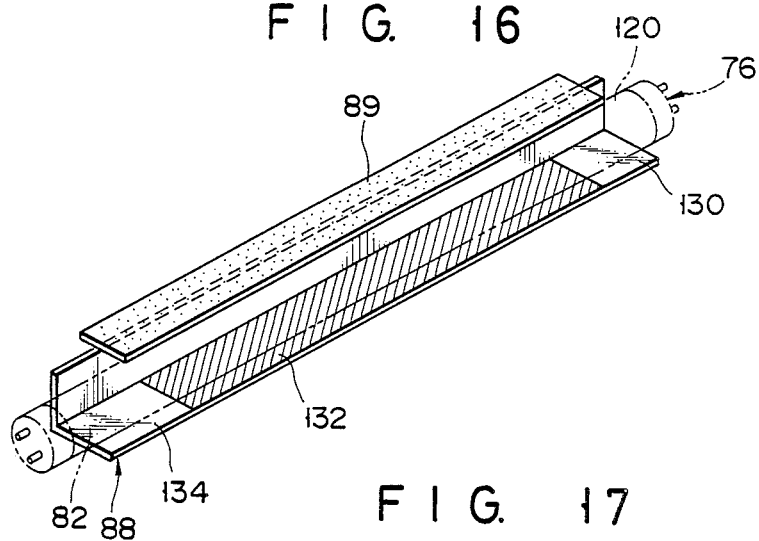
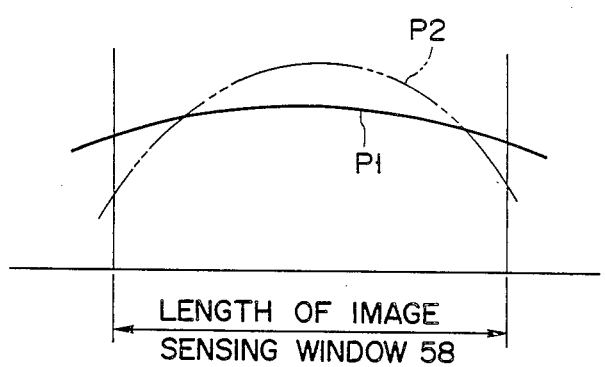

OPTICAL IMAGE SENSOR

BACKGROUND OF THE INVENTION

The present invention relates to an optical image sensor used in a facsimile or a copying machine and optically sensing an image, such as, for example, characters, numerals and a figure, on a document.

In an equipment, such as a facsimile or a copying machine, the image on a document is sensed by optical image sensing means, located in a body case, by utilizing the reflection of light emitted from a lamp located in the body case toward the image on the document through an elongated image sensing window formed on the body case while the document is moved at a predetermined speed on the image sensing window.

The lamp is a linear type fluorescent lamp. The fluorescent lamp is disposed in the body case so as to be parallel to the image sensing window at a position separated from the image sensing window at a predetermined distance. The standardized fluorescent lamp, which can ensure sufficient illuminance on the document in the image sensing window to prevent the optical image sensing means from erroneously sensing, is longer than the length of the image sensing window. In the optical image sensor of the conventional equipment described above, the linear type fluorescent lamp is disposed in the body case so as to bring the center in the longitudinal direction thereof into coincidence with that of the image sensing window, so that the both ends of the fluorescent lamp are projected from the both ends of the image sensing window at substantially equal distance. Thus, the optical image sensor of the conventional equipment described above has spaces for containing the both ends of the fluorescent lamp at the outside of the both ends of the image sensing window. Each of the pair of spaces has not small volume which can merely contain each of the both ends of the fluorescent lamp but has relatively large volume as compared with the volume of each of the both ends of the fluorescent lamp so as not to form projections on the outer surface of the case body. Main components of the optical image sensor of the equipment described above are disposed on a chassis in a space lying between the both ends of the image sensing window. The volume of each of the pair of spaces for containing the both ends of the fluorescent lamp is relatively larger than the volume of each of the both ends of the fluorescent lamp as described above but is too small to contain relatively large components in the equipment described above. Therefore, the pair of spaces for containing the both ends of the fluorescent lamp are not sufficiently utilized, and the spaces for containing the both ends of the fluorescent lamp have become dead spaces.

such dead spaces can be eliminated by providing a non-standardized and specially sized line type fluorescent lamp. Such lamp which can ensure sufficient illuminance on a document in the image sensing window to prevent the optical image sensing means providing erroneous reading and, nevertheless it has substantially the same length as that of the image sensing window. Utilization of such non-standardized and specially sized linear type fluorescent lamp is problematic because it causes the maintenance of the equipment to be more expensive as compared to when the standardized fluorescent lamp is used, because such non-standardized and specially sized linear type fluorescent lamp is more expensive than the standardized linear type fluorescent lamp and can be obtained only with difficulty.

SUMMARY OF THE INVENTION

Accordingly, the object of the present invention is to provide an optical image sensor which can eliminate dead spaces from a body case to reduce the size of the body case of an equipment using the optical image sensor and nevertheless which uses a standardized linear type fluorescent lamp.

The object of the present invention described above is achieved by an optical image sensor comprising a body case on which an elongate image sensing window is formed, a linear lamp disposed in the body case so as to be parallel to the image sensing window, and optically image sensing means disposed in the body case, wherein the optically image sensing means optically senses the image on a document moving on the case to cross the image sensing window by utilizing the reflection of light emitted from the lamp when the image passes over the image sensing window, the linear lamp is so disposed in the body case that the center in the longitudinal direction thereof is not brought into coincidence with that of the image sensing window, and a portion of the body case, corresponding to the one end of the linear lamp which is far away from the image sensing window, is constructed as article holding means.

In the optical image sensor according to this invention and characterized by the construction as described above, even if a standardized linear type lamp, the longitudinal length of which is longer than that of the image sensing window, is used to ensure sufficient illuminance on the document in the image sensing window, dead spaces are eliminated from the body case so that the size of the body case of an equipment using the optical image sensor becomes smaller than that of the conventional one, because the linear type lamp is so disposed in the body case that the center in the longitudinal direction thereof is not brought into coincidence with that of the image sensing window, and further a portion of the body case, corresponding to the one end of the linear type lamp which is far away from the image sensing window, is constructed as article holding means.

In the optical image sensor according to this invention and characterized by the construction as described above, if the optical image sensor is a facsimile with a handset, the article holding means may be a pair of recesses formed in correspondence with a speaker and a receiver of the handset and holding the speaker and the receiver, and the one end of the linear lamp may be disposed inside a portion located between the pair of article holding recesses of the body case and having a height higher than the pair of article holding recesses.

In this case, the higher portion of the body case may be a handset cradle. When the lamp is so disposed in the body case that the center in the longitudinal direction thereof is not coincidence with that of the image sensing window so that one end of the image sensing window faces the other end of the lamp output power of light of which is relatively small, it is possible that illuminance on one end of the image sensing window is smaller than that on the same place resulting from disposing lamp in the body case to make the center in the longitudinal direction thereof coincide with that of the image sensing window, and the optical image sensing means make an error in an image sensing work.

In this case, it is preferable that the optical image sensor further comprises means for forming a luminous intensity distribution curve obtained at the image sensing window by the light emitted from the lamp flat.

Making the luminous intensity curve flat does not cause illuminance gained at the image sensing window to be so small as to make an error in the image sensing work of the optical image sensing means.

The luminous intensity distribution averaging means may comprise means for reflecting a part in a portion of the light, emitted from the lamp and not directly arrived at the image sensing window, toward one end of the image sensing window disposed near to the other end of the lamp.

The light reflecting means may be a mirror disposed near to the one end of the image sensing window.

The mirror is not only made of glass but also made of any members having a planished surface.

Further, the luminous intensity distribution averaging means may comprise a transparent light diffusing plate located between the lamp and the image sensing window and accelerating to average the luminous intensity distribution curve obtained in the image sensing window by diffusing the light directed from the lamp to the image sensing window, and a reflecting plate disposed around the lamp at a position substantially symmetrical with respect to the image sensing window, and the light reflecting surface of the reflecting plate is so formed that the reflectance of at least a portion thereof facing to the other end of the lamp is higher than that of the other portion thereof not facing to the other end of the lamp.

The portion, having high reflectance, on the light reflecting surface of the reflecting plate may be constructed by coloring it with a color having high reflectance, and the portion, having low reflectance, on the light reflecting surface of the reflecting plate may be constructed by coloring it with low reflectance.

When the reflecting plate is formed of metal or plastics, color of either of which has a high reflectance, the portion, having high reflectance, on the light reflecting surface of the reflecting plate may be constructed by texture of its material, and the other portion, having low reflectance, on the light reflecting surface of the reflecting plate may be processed to be colored with a color having low reflectance.

When reflecting plate is formed of metal having a relatively high reflectance, the portion, having high reflectance, on the light reflecting surface of the reflecting plate may be constructed by planishing, and the other portion, having low reflectance, on the light reflecting surface of the reflecting plate may be processed to be colored with a color having low reflectance.

BRIEF DESCRIPTION OF THE DRAWINGS

FIG. 13 is schematical plan view showing a second modification of the embodiment of the present invention, the embodiment being shown in FIGS. 1 to 8, wherein a light reflecting surface of a reflecting plate is so formed that the reflectance of a portion thereof facing to the nearly located one end of the linear type lamp is higher than that of the other portion thereof not facing to the nearly located one end of the lamp, and the luminous intensity distribution averaging means is constructed by the reflecting plate constructed as described above and a transparent light diffusing plate disposed between the linear type lamp and the image sensing window;

FIG. 14 is a schematical perspective view of main parts of the second modification in FIG. 13;

FIG. 15 is a schematical plan view showing main parts of a conventional optical image sensor, but in which luminous intensity distribution averaging means is constructed by a transparent light diffusing plate disposed between a linear type lamp and an image sensing window and a light reflecting plate, the reflecting surface of the light reflecting plate being constructed by a plurality of portions each of which has a different reflectance each other similar to the light reflecting plate used in the second modification of FIGS. 13 and 14;

FIG. 16 is a schematical perspective view of main parts of the conventional optical image sensor in FIG. 15; and FIG. 17 is a schematical diagonal showing luminous intensity distribution curves gained at the image sensing window when the luminous intensity distribution averaging means shown in FIGS. 15 and 16 is used in the conventional optical image sensor described above and when a conventional light reflecting plate, having a light reflecting surface on which reflectance has the same value at any place, is used in the conventional optical image sensor.

An embodiment of the present invention and various modifications thereof will now be described with reference to the accompanying drawings.

DETAILED DESCRIPTION OF THE PREFERRED EMBODIMENTS

FIGS. 1 to 7 show a facsimile with a handset having an optical image sensor according to an embodiment of the present invention.

Figure 1:
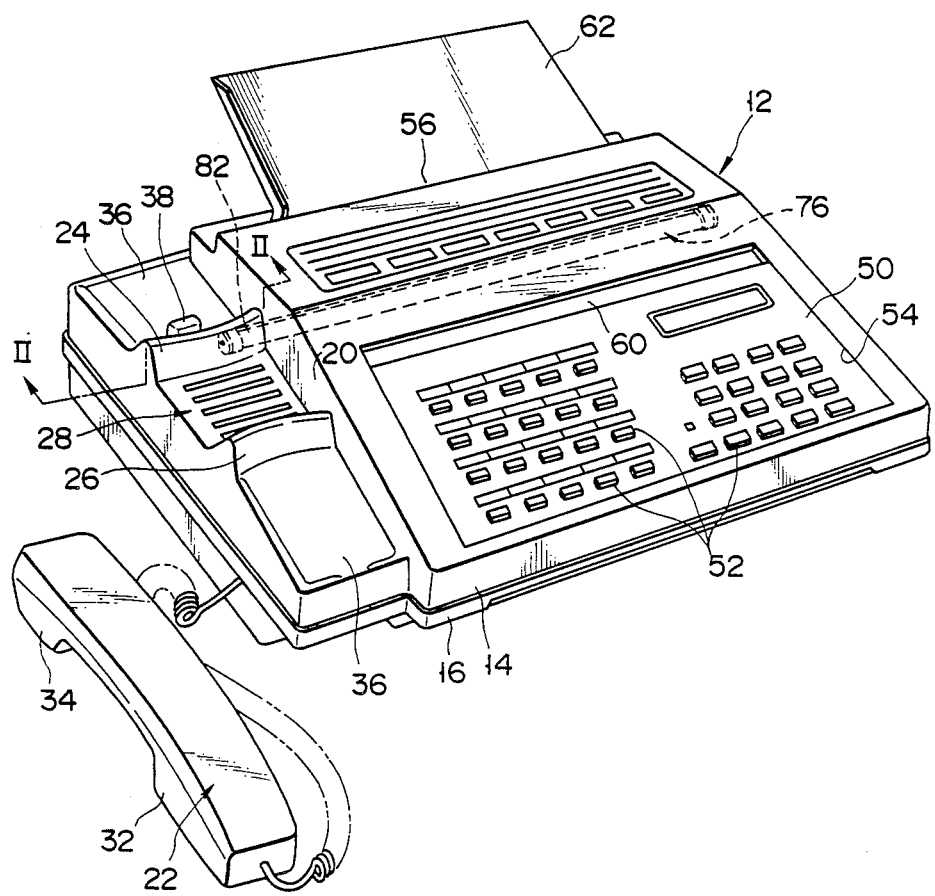
FIG. 1 is a schematical perspective view of a facsimile with a handset, in which an optical image sensor according to an embodiment of the present invention is used.

In FIG. 1, a facsimile has body case 12 made of synthetic resin. Body case 12 includes upper case 14 and lower case 16. Upper and lower cases 14 and 16 are coupled by screws 18 (shown partly only in FIG. 4). A handset placing portion (article holding means) 20 is integrally formed with one end side of upper case 14. Handset 22 is placed on placing portion 20. Handset cradle 28 having a pair of projections 24 and 26 for positioning handset 22 is provided at the center of placing portion 20. Projections 24 and 26 are projected from the upper surface of handset placing portion 20. Recesses 30 are formed, as one projection 24 is representatively shown in FIGS. 2 and 3, on the inner surface side (lower surface side) of projections 24, 26. As shown in FIG. 1, handset placing portion 20 has a pair of recesses 36 for containing speaker 32 and receiver 34 of handset 22 outside a pair of projections 24 and 26 of handset cradle 28. Plunger 38 is provided near to projection 34.

In this embodiment, two projections 24 and 26 are provided at separate positions from each other. However, projections 24 and 26 may be integrated to form a large projection. In summary, projections 24 and 26 for holding a handset may have any shape if projections 24 and 26 may be used as guide means for placing handset 22 at a predetermined position on placing portion 20.

Figure 4:
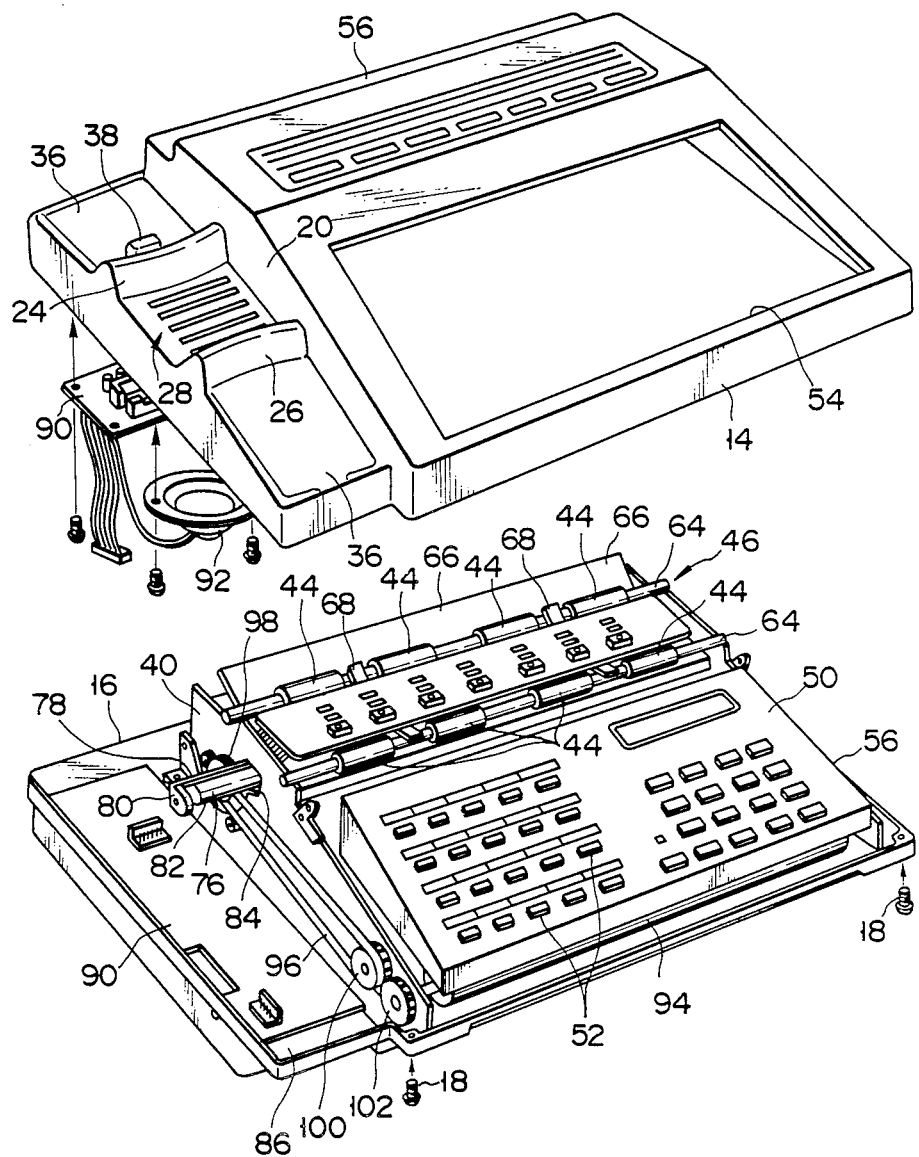
FIG. 4 is a schematical perspective view of the facsimile with a handset, in which an upper case is removed.

As shown in FIG. 4, metal chassis 40 is contained in body case 12. As particularly shown in FIG. 5, document feeding means 46 using feed rollers 42 and pinch rollers 44, optical image sensing means 48 to be described latter, and a well known electric circuit for transmitting sensed image (e.g., a character, a numeral and/or a figure) through telephone channel network are provided on chassis 40. Print means (not shown) having a head for printing received image, such as character, numeral and/or figure, on a recording sheet is contained inside body case 12. Various operation keys 52 are provided on operation panel 50 mounted on chassis 40. Operation panel 50 is engaged, as shown in FIG. 1, in opening 54 formed on upper case 14.

Figure 5:
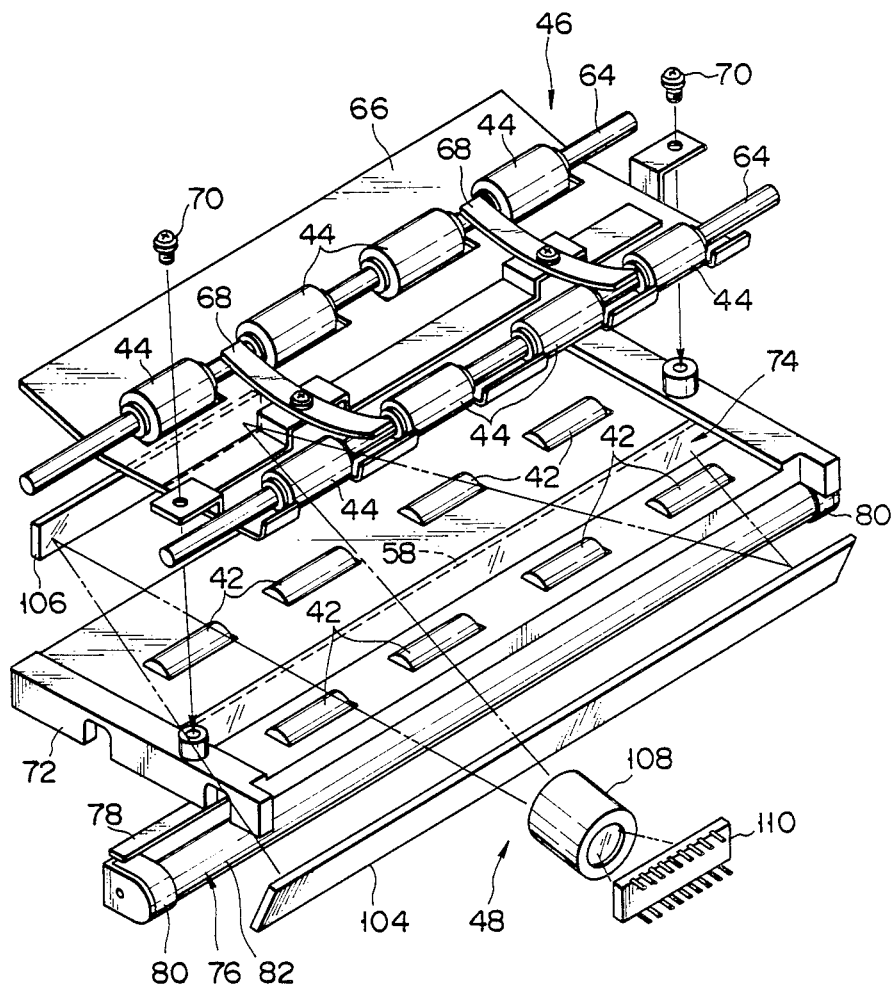
FIG. 5 is a schematical perspective view of document feeding means and optical image sensor, both of which are contained in a body case of the facsimile.

Feed rollers 42 are driven at a predetermined rotating speed by a motor (not shown) to pass a document (including a drawing), fed from slit-shaped document inlet 56 formed at the rear end portion of upper case 14 as shown in FIG. 1 into body case 12, over image sensing window 58 formed on chassis 40 (FIG. 5) and to then discharge the document from document outlet 60 formed of a slit-shaped gap not covered with operation panel 50 in opening 54 of upper case 14. Document tray 62 is mounted on document inlet 56. As particularly shown in FIG. 5, shaft 64 of pinch rollers 44 is rotatably supported on plate-like holder 66 by leaf springs 68. As shown in FIG. 5, holder 66 is fixed to one component member 72 of chassis 40 by screw 70.

Image sensing window 58 is elongated in a direction perpendicular to the conveying direction of the document. Transparent glass plate 74 is fitted in image sensing window 58.

A linear type fluorescent lamp 76 is disposed under image sensing window 58 so as to be parallel to image sensing window 58. Lamp 76 is held, as shown in FIG. 5, by a pair of right and left lamp sockets 80 provided at both ends of metal supporting frame 78.

Figure 2:
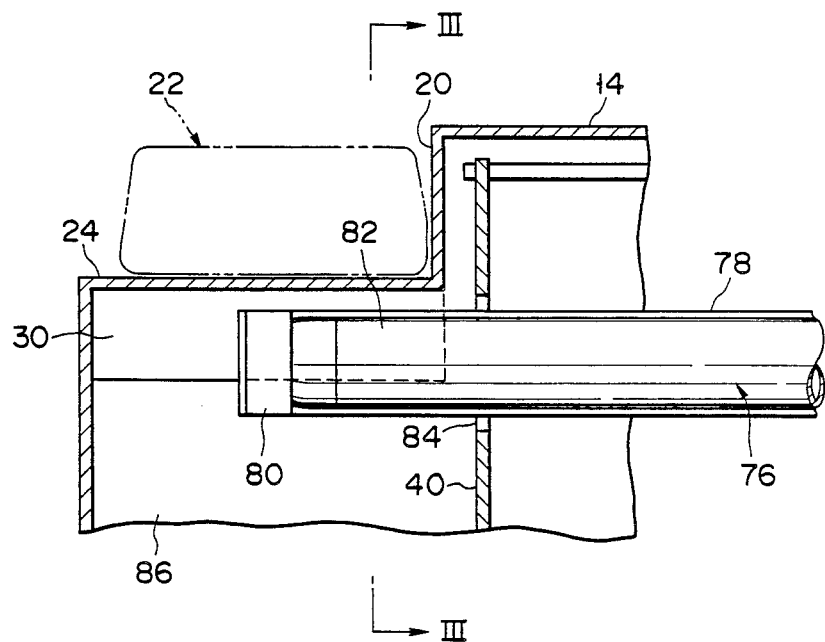
FIG. 2 is a schematical partial sectional view taken along the line II—II in FIG. 1.
Figure 3:
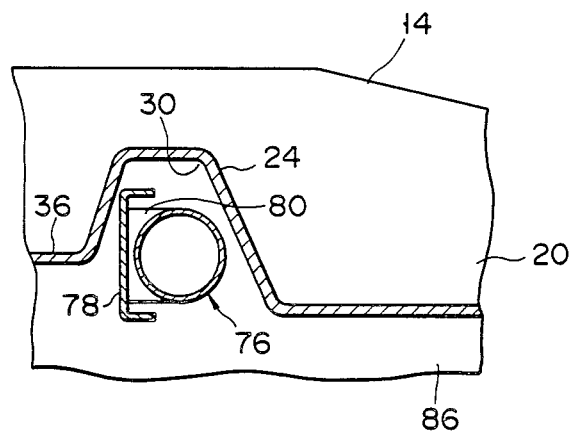
FIG. 3 is a schematical partial sectional view taken along the line III—III in FIG. 2.
Figure 6:
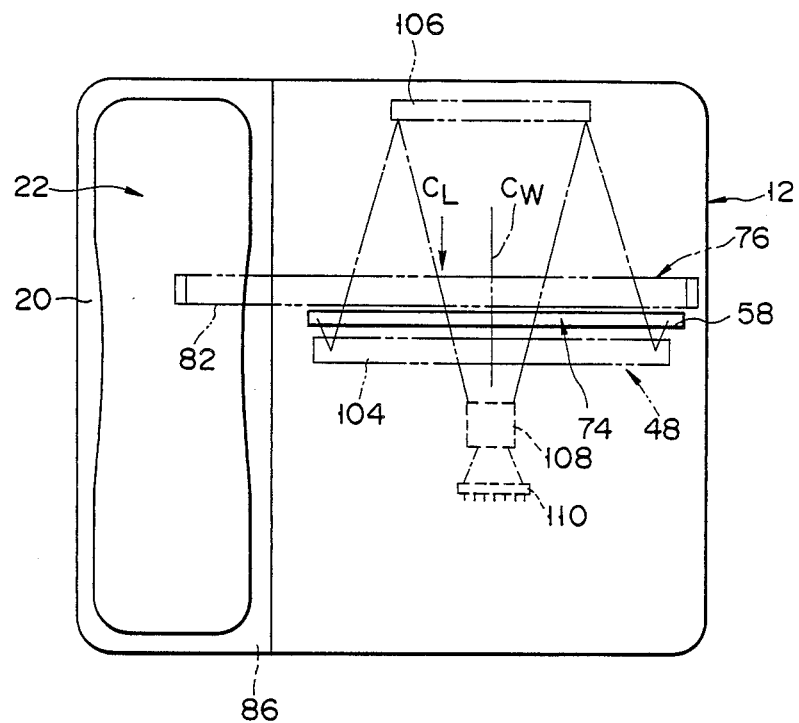
FIG. 6 is a schematical plan view showing an arrangement of a linear type lamp with respect to an image sensing window in the body case of the facsimile in FIG. 1.

Lamp 76 is so disposed, as shown in FIG. 6, that its center position $C_L$ in the longitudinal direction thereof is displaced from center position $C_W$ of the image sensing window 58 toward handset placing portion 20. When lamp 76 is mounted on supporting frame 78, end 82 of lamp 76 located at the side of handset placing portion 20 is, as shown in FIGS. 2 and 4, inserted into lamp inserting hole 84 formed at the side wall of chassis 40, the side wall being located at the side of handset placing portion 20. End 82 of lamp 76 is projected, as particularly shown in FIGS. 1, 2, 3 and 6, into portion 86, corresponding to handset placing portion 20, in the space of body case 12 and located in recess 30 defined by the inner surface of one projection 24. Recess 30 can be effectively utilized by introducing end 82 of lamp 76 into recess 30 defined by the inner surface of projection 24 of handset cradle 28, so that recess 30 is not a dead space.

Figure 7:
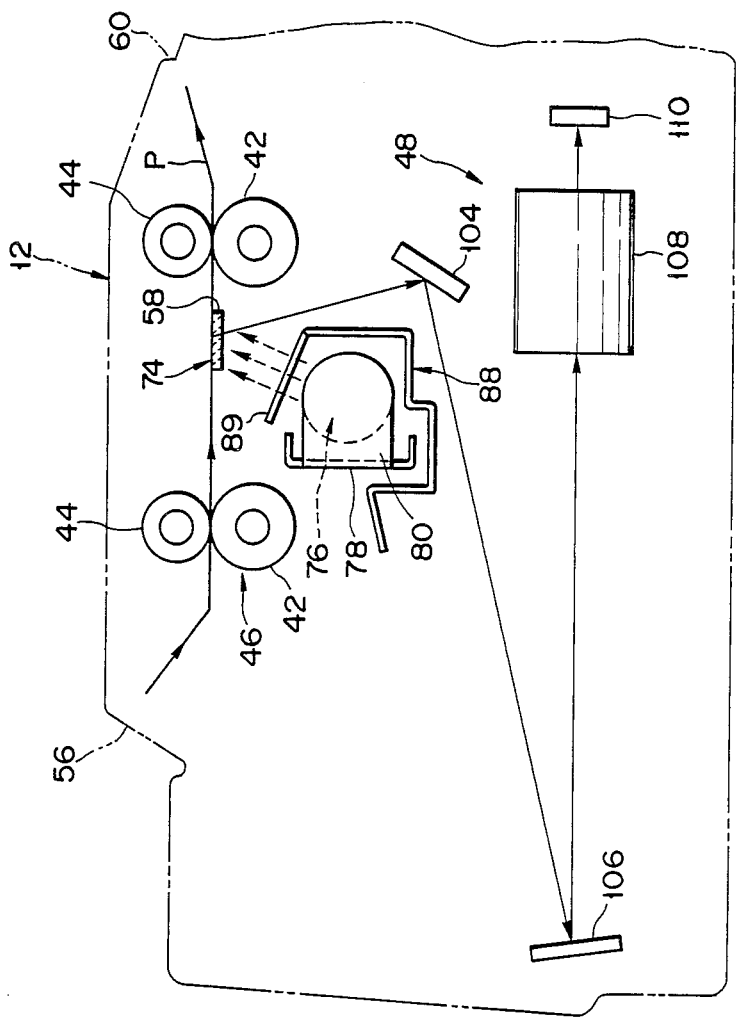
FIG. 7 is a schematical side view showing operations of the linear type lamp, the document feeding means, and the optical image sensor in the body case of the facsimile in FIG. 1.

Reflecting plate 88 (FIG. 7) is provided on chassis 40 at substantially symmetrical position to image sensing window 58 with respect to lamp 76. Reflecting plate 88 is in parallel to lamp 76 and reflects the light, emitted from lamp 76 and directed toward the opposite direction to image sensing window 58 (i.e., toward back surface side), toward image sensing window 58. Light diffusing plate 89 extended in the longitudinal direction of image sensing window 58 is provided on chassis 40 between image sensing window 58 and lamp 76 so as to be parallel to image sensing window 58. Light diffusing plate 89 is formed of milky white colored transparent resin or a transparent plate on which the surface is roughened like ground glass. The light emitted from lamp 76 toward image sensing window 58 is diffused through light diffusing plate 89 and reached to image sensing window 58. Light diffusing plate 89 serves to make uniform the luminous intensity distributing curve of the light from lamp 76 obtained at image sensing window 58. This prevents the optical image sensing means from erroneously sensing in image sensing on the document passing over the image sensing window 58. In FIG. 7, an arrow P denotes a moving path of the document from document inlet 56 to document outlet 60 through image sensing window.

Portion 86 of the space in body case 12 corresponding to handset placing portion 20 is lower in height than a portion of the space surrounded by chassis 40, and various components, such as circuit board 90 provided with various electric circuits for handset 22, electric circuit member 90 fixed to the inner surface of handset placing portion 20 and being used for plunger 38, and speaker 92 are contained, as shown in FIG. 4, in high density in space 86. Transmission belt 96, pulleys 98, 100, and a driving component, such as gear 102, are disposed on the side wall of chassis 40 adjacent to space 86. The belt and the pulleys are used for rotating recording sheet feed roller 94. The driving components are projected into space 86.

Optical image sensing means 48 has a pair of mirrors 104 and 106, lens system 108 and CCD (Charge Coupled Device) 110. As shown in FIGS. 6 and 7, first mirror 104 is provided at a position for receiving light reflected from the document at image sensing window 58. Second mirror 106 is disposed at a position for reflecting reflected light from first mirror 104 toward lens system 108. CCD 110 is provided at focusing position of lens system 108 to convert the image on the document fed from image sensing window 58 as described above into an electric signal.

In the facsimile constructed as described above, the document which is so placed on tray 62 shown in FIG. 1 that the image is directed downward is introduced into document inlet 56 while sliding on tray 62. As shown in FIG. 7, the document passes over image sensing window 58 along the document conveying path designated by symbol P while being conveyed at a constant speed by the rotation of roller 42 of document feeding means 46. The light emitted from lamp 76 and reflected on the surface of the document in image sensing window 58 is fed to CCD 110 through first and second mirrors 104 and 106 and lens system 108. According to the reflected light, CCD 110 converts the image on the document into an electric signal and transmits the electric signal through a telephone channel.

Then, referring to FIGS. 8 to 12, first modification of the embodiment of the present invention will be described.

In FIGS. 8 to 12, the same reference numerals are used for designating the same parts in the modification as those in the embodiment in FIGS. 1 to 7, and the detailed description thereof will be omitted.

Figure 8:
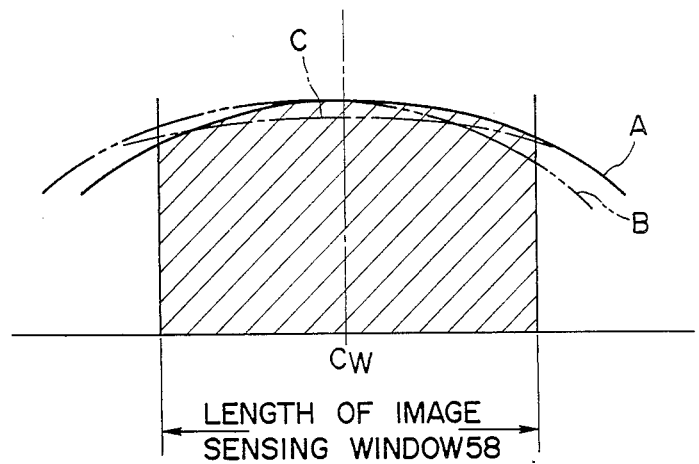
FIG. 8 is a diagram schematically showing luminous intensity curves gained at the image sensing window of the facsimile of FIG. 1 when luminous intensity distribution averaging means is provided and when a position of the linear type lamp relative to the image sensing window in the longitudinal direction thereof is changed.
Figure 9:
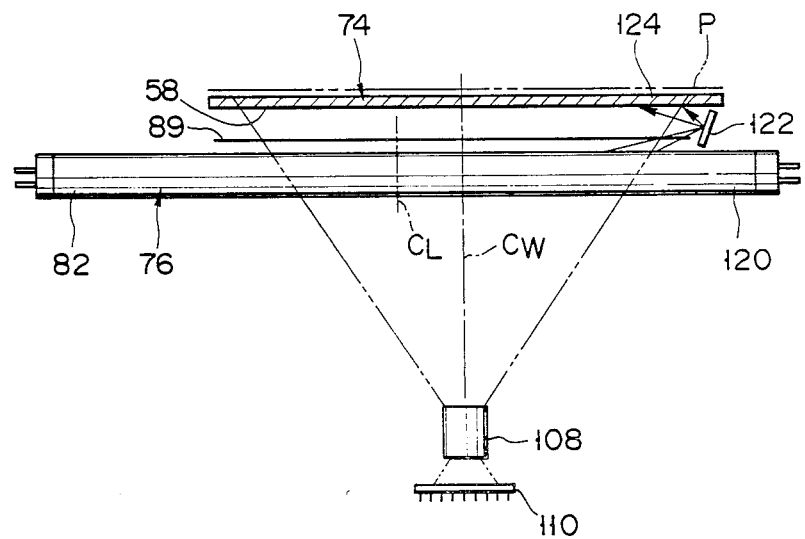
FIG. 9 is a schematical plan view showing main parts of a first modification of the embodiment of this invention, the embodiment being shown in FIGS. 1 to 8, wherein an auxiliary reflecting member as the luminous intensity distribution averaging means is disposed between one end of the image sensing window and one end of the linear type lamp which is located near to one end of the window.
Figure 10:
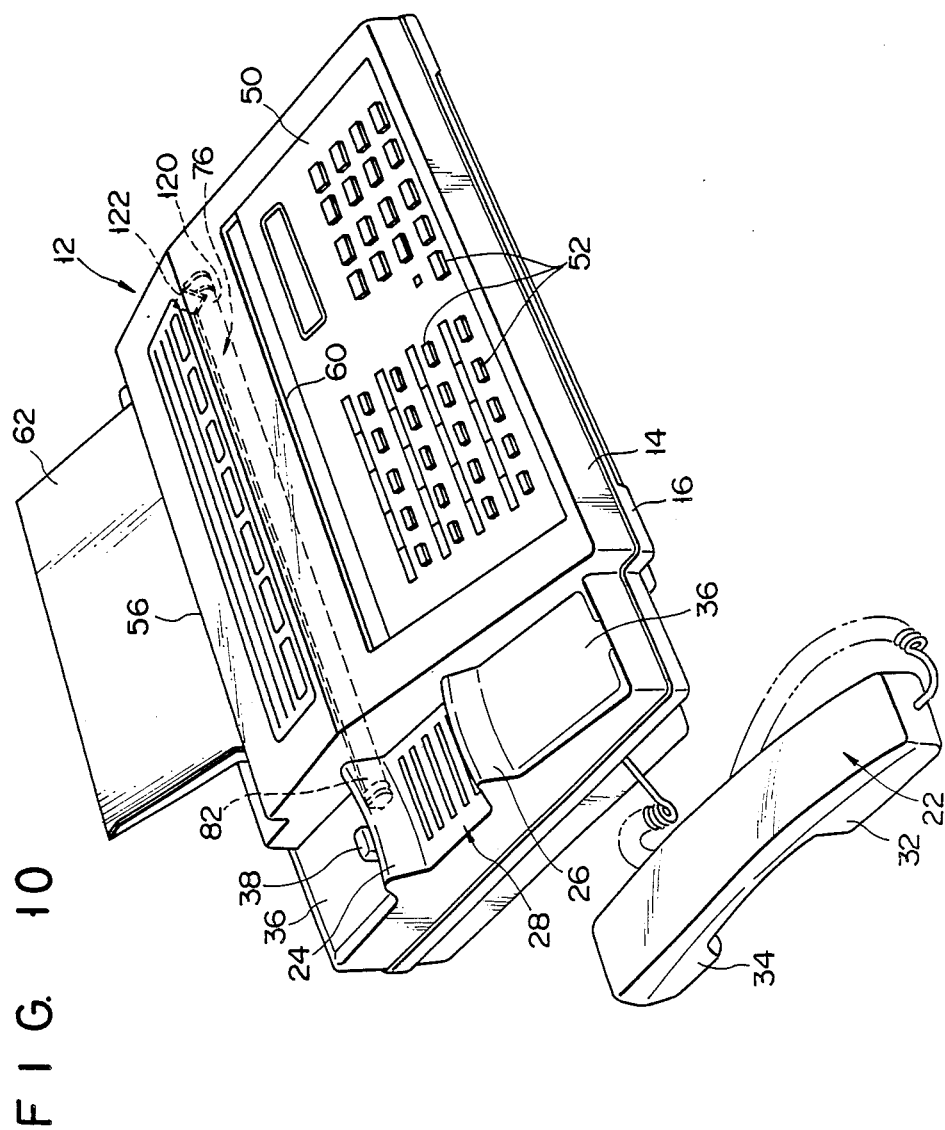
FIG. 10 is a schematical perspective view showing an outside appearance of a facsimile with a handset, in which the optical image sensor of the first modification, main parts of the first modification being shown in FIG. 9, is used.
Figure 11:
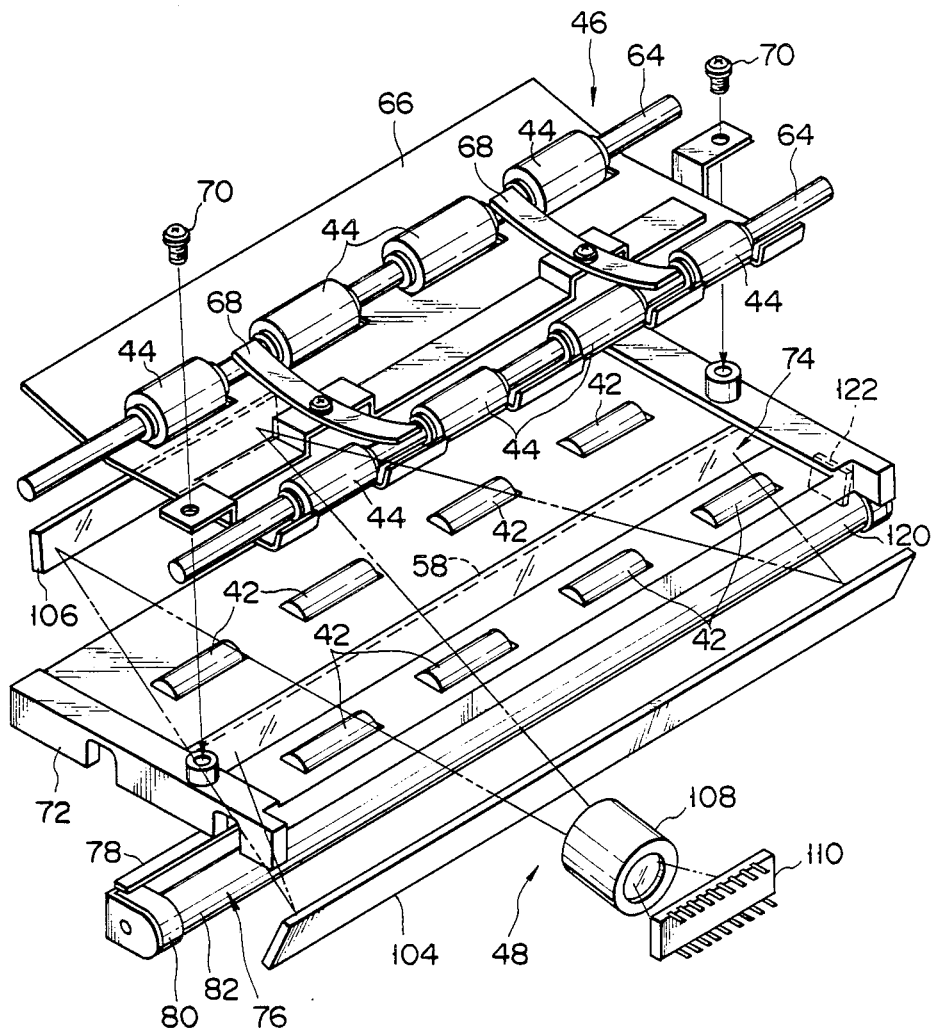
FIG. 11 is a schematical perspective view of a document feeding means and an optical image sensor including the auxiliary reflecting member, both of which are contained in the body case of the facsimile in FIG. 10.
Figure 12:
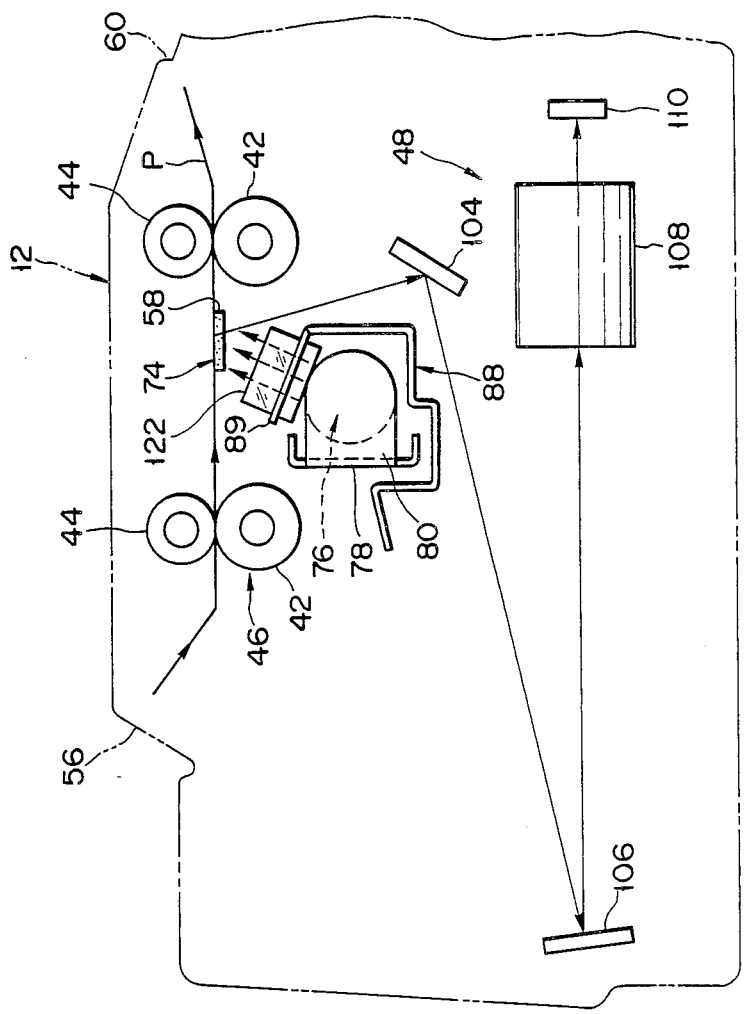
FIG. 12 is a schematical perspective view showing operations of a linear type lamp, a document feeding means, and the optical image sensor including the auxiliary reflecting member, these of which are contained in the body case of the facsimile in FIG. 10.

Since the outputs of the lights at both ends of linear type fluorescent lamp 76 are lower than that between the both ends of fluorescent lamp 76, the luminous intensity distribution curve obtained at image sensing window 58 when central position $C_L$ of the lamp is brought into coincidence with that $C_W$ of image sensing window 58 like the conventional optical image sensor is substantially symmetrical at the right and left sides as shown by a solid line "A" in FIG. 8. Therefore, when central position $C_L$ of lamp 76 is displaced from that $C_W$ of image sensing window 58 as in the present invention, the illuminance at the end of image sensing window 58 in correspondence with the other end 120 of lamp 76 decreases as shown by two-dotted chain line "B" in FIG. 8. This might cause optical image sensing means 48 to provide erroneous readings.

In order to prevent the optical image sensing means 48 from erroneously reading document 56, in the first modification, auxiliary reflector 122 as light distribution averaging means is provided near to other end 120 of lamp 76 between image sensing widow 58 and lamp 76. This auxiliary reflector 122 is formed of a metal plate surface of which is planished. Auxiliary reflector 122 is mounted on chassis 40 so as to reflect part of a portion of the light toward end 124 of image sensing window 58 corresponding to the other end 120 of lamp 76, the portion of light emitting from lamp 76 and not directly arriving at image sensing window 58.

The light reflecting surface of auxiliary reflector 122 is preferably of a planished surface, but may be formed of a member coated with white like color having high reflectance or having a material of this color, or utilize a metal surface as the light reflecting surface without planishing if the metal surface has color of high reflectance such as silver gray. The decrease in the illuminance generated at end 120 of image sensing window 58 owing to the central position $C_L$ of lamp 76 be non-coincident with center $C_W$ of image sensing window 58 is eliminated by reflecting a part of a portion of the light. The portion of the light part of which is thus reflected is emitted from lamp 76 and not directly arriving at image sensing window 58. Such light is reflected toward end 120 of image reading window 58 by auxiliary reflector 122.

The light distribution curves denoted by the solid line "A" and the two-dotted chain line "B" in FIG. 8 are exaggerated as compared with the real ones so as to facilitate their being readily understand. The solid line "A" and the two-dotted chain line "B" actually obtained are more flat at the center, and the decreases in the illuminance at both right and left side ends are smaller.

Referring to FIGS. 13 and 14, a second modification of the embodiment of the present invention will be described.

In FIGS. 13 and 14, the same reference numerals are used for designating the same parts in the second modification as those in the embodiment in FIGS. 1 to 7 and the first modification in FIGS. 8 to 12, and the detailed description thereof will be omitted.

The technical advantages gained at the second modification are the same as that of the first modification described above.

In the second modification, reflecting plate 88 is formed by bending a metal plate of silver gray color. Portion 130 of effecting plate 88 facing the other end 120 of lamp 76 is formed as a light reflecting surface made of a silver gray metal texture. Portion 132 substantially corresponding to image sensing window 58, except light reflecting portion 130, is coated with a color for absorbing the light, such as black color. Reflecting plate 88 may be formed of synthetic resin. In this case, light reflecting portion 130 is coated with a color having high reflectance like white color or employs material having high reflectance. Even if relecting plate 88 is formed of a metal material, the light reflecting portion 130 may be colored with a color having high reflectance or may be planished.

In the second modification constructed as described above, a portion of the light emitted from lamp 76 toward reflecting plate 88 is reflected by reflecting plate 88 toward image sensing window 58. Here, the light incident to light reflecting portion (high reflectance portion) 130 is mostly directed toward end 124 of image sensing window 58 corresponding to other end 120 of lamp 76, and the light incident to light absorbing portion 132 is partly absorbed by light absorbing portion 132, and then directed toward the portion of image sensing window 58 except end 124.

Thus, even if central position $C_L$ of lamp 76 is displaced with respect to center $C_W$ of image sensing window 58, the luminous intensity distribution curve obtained at image sensing window 58 by the light emitted from lamp 76 can be formed symmetrical with respect to the right and left sides and flat as designated by the solid line "C" in FIG. 8.

The technique for averaging the luminous intensity distribution curve by providing a plurality of portions having different reflectances relative to each other on the reflecting surface of the reflecting plate 88, is effective for the conventional optical image sensor in which the center position $C_L$ of lamp 76 is coincident with the center position $C_W$ of image sensing window 58.

In this case, as shown in FIGS. 15 and 16, both ends 134, 130 of reflecting plate 88 corresponding to one and the other ends 82 and 120 of lamp 76 are formed to have higher reflectance than that on the intermediate portion 132 on the reflecting surface between both ends 134, 110 of reflecting plate 88.

To put it in the concrete, a pair of high reflectance portions, 130, 134 and low reflectance portion 132 are formed by the same process as those for high reflectance portion 130 and low reflectance portion 132.

In FIG. 17, a luminous intensity distribution curve, gained at the conventional image sensing window 58 described above when the reflectance on the reflecting surface of reflecting plate 88 is changed as shown in FIGS. 15 and 16, is shown by solid line P1, and another luminous intensity distribution curve, gained at the conventional image sensing window 58 described above when the reflectance on the reflecting surface of reflecting plate is uniform, is shown by two-dot chain line P2.

As shown in FIG. 17, solid line P1 is flatter in comparison with two-dot chain line P2.

What is claimed is:

1. An optical image sensor comprising a body case on which an elongated image sensing window is formed, a linear lamp disposed in the body case so as to be parallel to the image sensing window, and optically sensing means disposed in the body case, wherein the optically image sensing means optically senses the image on a document moving on the case to cross the image sensing window by utilizing the reflection of light emitted from the lamp when the image passes over the image sensing window, said linear lamp is so disposed in the body case that the center in the longitudinal direction thereof is not brought into coincidence with the center of the image sensing window in the longitudinal direction, and
   a portion of the body case, corresponding to the one end of the linear lamp which is further away from the center of said image sensing window, comprises an article holding means.

2. The optical image sensor according to claim 1, wherein
   said optical image sensor is a device with a handset,
   said article holding means is a pair of article holding recesses formed in correspondence with a speaker and a receiver of the handset and holding the speaker and the receiver, and
   the one end of said linear lamp is disposed inside a portion of the body case located between the pair of article holding recesses of the body case and having a height higher than the pair of article holding recesses.

3. The optical image sensor according to claim 2, wherein
   said higher portion of the body case is a handset cradle.

4. The optical image sensor according to claim 1, wherein said lamp has a characteristic luminous intensity distribution curve,
   said optical image sensor further comprises means for flattening said luminous intensity distribution curve generated in the image sensing window by the light emitted from the lamp.

5. The optical image sensor according to claim 4, wherein
   said means for flattening the luminous intensity distribution curve comprises means for reflecting a part of the light, which is emitted from the lamp and not directed at the image sensing window, toward one end of the image sensing window disposed near to the other end of the lamp.

6. The optical image sensor according to claim 5, wherein
   said light reflecting means is a mirror disposed near to said one end of the image sensing window.

7. The optical image sensor according to claim 4, wherein
   said means for flattening the luminous intensity distribution curve comprises a transparent light diffusing plate located between the lamp and the image sensing window and positioned to flatten the luminous intensity distribution curve generated in the image sensing window by diffusing the light directed from the lamp to the image sensing window, and a reflecting plate disposed around the lamp at a position substantially symmetrical with respect to the image sensing window, and
   the light reflecting surface of the reflecting plate is so formed that the reflectance of at least a portion thereof facing toward said other end of the lamp is higher than that of the other portion thereof not facing toward said other end of the lamp.

8. The optical image sensor according to claim 7, wherein
   said higher reflectance portion on the light reflecting surface of said reflecting plate is colored with a color having a first reflectance, and said other end portion, having lower reflectance, on the light reflecting surface of said reflecting plate is colored with a color having a second reflectance lower than said first reflectance.

9. The optical sensor according to claim 7, wherein
   said reflecting plate is formed of metal or plastic, the color of either of which has a first reflectance,
   said higher reflectance portion on the light reflecting surface of said reflecting plate is constructed by texture of its material, and
   said other portion, having low reflectance, on the light reflecting surface of said reflecting plate is processed to be colored with a color having a second reflectance lower than said first reflectance.

10. The optical image sensor according to claim 7, wherein
    said reflecting plate is formed of metal having a relatively high reflectance,
    said higher reflectance portion on the light reflecting surface of said reflecting plate is constructed by planishing, and
    said other portion, having low reflectance, on the light reflecting surface of said reflecting plate is processed to be colored with a color having a lower reflectance than said planished portion.

* * * * *